United States Patent Office

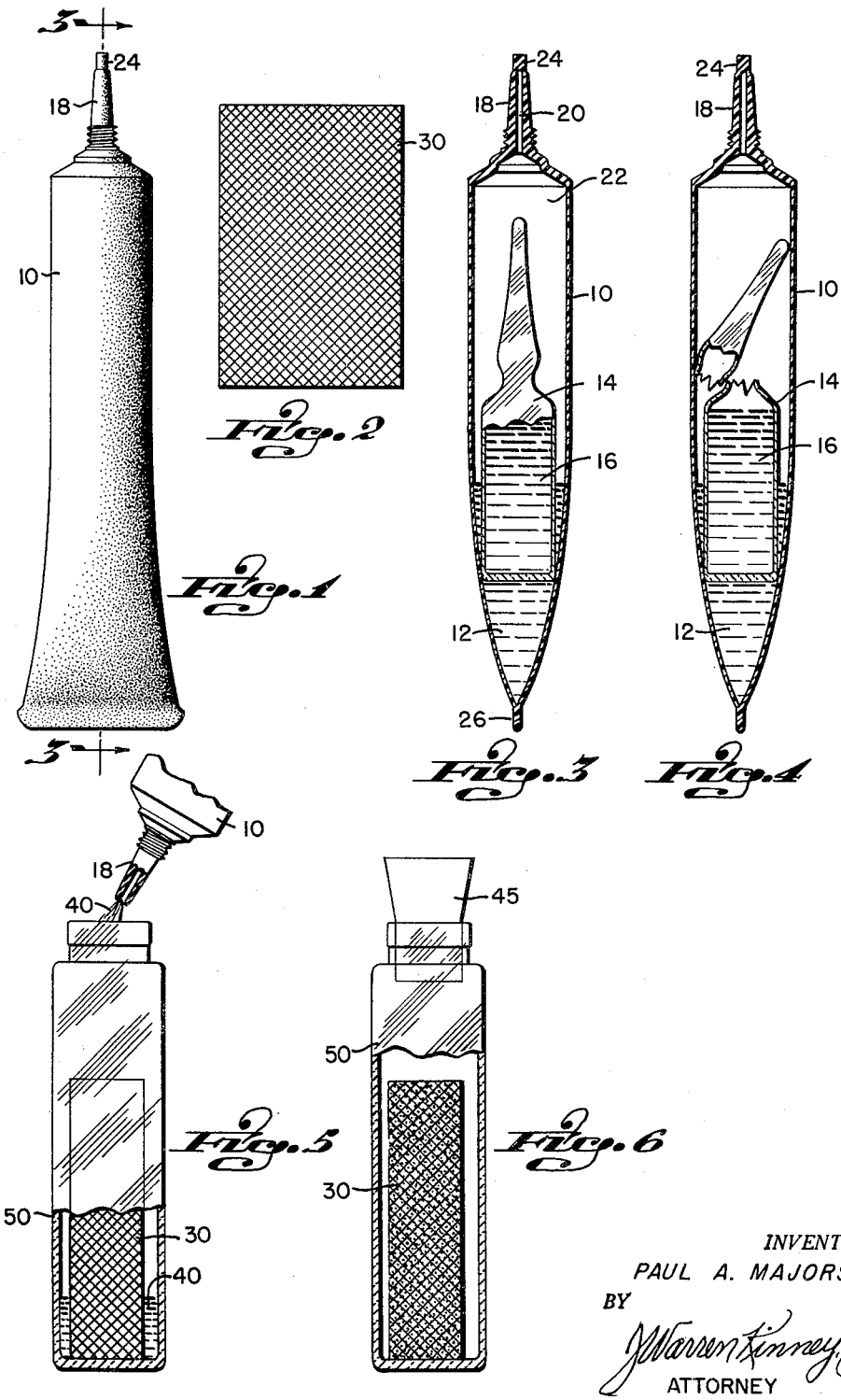

3,068,154
Patented Dec. 11, 1962

3,068,154
APPARATUS FOR PREPARING A FRESH CULTURE OF MICROORGANISMS
Paul A. Majors, Cincinnati, Ohio, assignor to Hill Top Research Institute, Inc., Miamiville, Ohio, a corporation of Ohio
Filed Nov. 4, 1959, Ser. No. 850,846
1 Claim. (Cl. 195—54)

This invention relates to a method of and apparatus for testing the effectiveness of germicidal treatment, and more particularly to a method which may be practiced by non-technical trained personnel using self-contained, easily portable equipment.

An object of the invention is to provide testing apparatus in the form of a flexible housing containing both a fluid and a frangible vial which contains a reactive fluid, whereby the vial may be expeditiously broken while housed within said housing for permitting the contents of the vial to be thoroughly mixed with the fluid of the tubular member.

Another object of the invention is to provide a tubular housing member having the hereinabove described characteristics, which is fabricated from a tough, pliable, fluid impervious substance capable of being deformed in order that the vial contained therein may be fractured, without rupturing, puncturing or otherwise injuring the fluid-retaining characteristics of the tubular member.

A further object of the invention is to provide a tubular member having the hereinabove described characteristics, which member is provided with a normally closed discharge spout through which the contents of the member may be discharged incident to removal of the spout tip.

Still another object of the invention is to teach a simple, highly effective method for enabling non-technical personnel to conduct tests for ascertaining the effectiveness of germicidal treatment applied to various substances such fabric, hair and the like.

These and other objects are attained by the means described herein and as disclosed in the accompanying drawings, in which:

FIG. 1 is a plan view of a typical tubular member embodying the teachings of the present invention.

FIG. 2 is a top elevational view of a typical cloth sample prior to being tested for ascertaining the effectiveness of germicidal treatment to which the sample has previously been subjected.

FIG. 3 is a vertical sectional view on line 3—3 of FIG. 1, showing the normal relationship of the tubular member, its contents and the frangible vial housed therein.

FIG. 4 is a view similar to FIG. 3, illustrating the relationship of the parts after the vial has been fractured.

FIG. 5 illustrates the manner in which the mixed contents of the fluids of FIG. 4 are applied to the cloth sample of FIG. 2, which sample is housed within a bottle.

FIG. 6 is a view similar to FIG. 5, after the period of incubation has passed and illustrating the color change which occurred in the sample under test.

With particular reference to FIGS. 3 and 4, the numeral 10 denotes generally a tubular member fabricated from a suitable plastic material. The numeral 12 denotes a sterile culture medium which will support luxuriant growth of the test organism and which contains a color indicator which will change in such a manner as to indicate growth of the test organism.

The numeral 14 denotes a sealed ampoule containing a stable living inoculum 16 of the test organism.

One end of the tube may be provided with or terminate in an elongate nozzle 18 having a bore 20 therethrough in communication with the interior 22 of the tube, the outer end of which bore is suitably closed as at 24 for precluding the accidental or unintentional discharge of the contents of tube 10.

The lower end of the tube is suitably closed as at 26 by any means not relevant to the present disclosure.

From the foregoing, and with particular reference to FIG. 3, it will be noted that tube 10 comprises a device which may be easily stored, packaged, shipped and used.

The numeral 30 denotes generally a piece of cloth, paper, cotton, wool, synthetic fibers or any other type of wettable material to be tested for its anti-microbial properties. The culture media 12 is prepared according to accepted bacteriological technique for supplying the growth requirements of the test organisms by inclusion of various plant and animal tissue extracts and infusions. Inorganic salts are added to supply nutrients, buffer the hydrogen ion concentration to that desired, to regulate the rapidity with which the hydrogen ion concentration of the medium would change when growth of the test organism occurred, to regulate the osmotic tension of culture media and to supply a substrate which will be altered in such a way, by growth of the test organism, to result in a change in the indicator.

The culture medium 12 is introduced into the interior of tube 10, after which the sealed frangible ampoule 14 containing stable viable inoculum 16 is inserted into the tube, after which the tube is loosely capped and the entire unit sterilized by gaseous sterilization, the living inoculum being protected by the sealed ampoule during this sterilization. After sterilization the open end of the plastic tube is suitably sealed such as by the application of heat and pressure as at 26.

The anti-microbial properties of material 30 are tested as follows: The sample 30 is inserted into a vial 50. In the preferred embodiment of the invention two or three thicknesses of the material to be tested may be used. When the material is inserted into a vial, care should be exercised to prevent appreciable folding of the material.

The culture media 12 is inoculated with the stable living inoculum 16 of the test organism by shattering ampoule 14 such as by placing tube 10 on a firm surface holding the side of the tube down so it is in contact with the enclosed ampoule and striking the ampoule through the tube with a smooth, hard object such as a small hammer, screw driver handle or the like. Tube 10 should then be shaken whereby to thoroughly mix the inoculum 16 with the culture medium 12, after which the end of the nozzle 18 may be severed and the inoculated medium 40 distributed onto and over the surface of the test samples 30 in vials 50, FIG. 5.

Uniformly satisfactory results have been obtained in those instances wherein just sufficient inoculated medium is placed on each sample to saturate or thoroughly impregnate it. After the samples have been thus impregnated, the vials should be inverted for a short time to drain off any excess liquid 40, after which the vials are sealed by means of a stopper, or the like, 45.

The closed vials may be then incubated at room temperature or at specified temperature in certain types of application. After a suitable incubation period the tubes may be examined for evidence of growth of the test organism which will be immediately obvious if the indicator is present in the medium during incubation. The presence of such medium will be readily apparent by reason of the color change which will occur in the sample 30.

Having thus broadly described the invention, the following examples are presented for indicating typical applications of the present invention as applied to:

I. Urealytic organisms
II. Acidogenic organisms
III. With fungi

I. Urealytic Organisms

Under this general heading the teachings hereinabove described may be utilized, by way of example, to (a) Evaluate the ability of absorbent test materials to inhibit the growth of gram negative or gram positive bacteria, (b) Evaluate the ability of absorbent test materials soiled with urine to inhibit the formation of ammonia by preventing the fermentation of urea which is present in normal urine.

Uniformly satisfactory results have been obtained in those instances wherein the sterile culture media 12 comprises, by weight:

|  | Percent |
|---|---|
| NaCl | 0.5 |
| Beef extract | 0.5 |
| Peptone (Thiotone or Bacto-Peptone) | 1.0 |
| $Na_2HPO_4$ | 1.74 |
| $KH_2PO_4$ | 0.76 |
| Urea | 2.5 | pH adjusted to 6.8.
Distilled water, q.s. 100 milliliters.

The color indicator used was Phenol Red, 0.002%.

A suitable gram positive stable living inoculum 16 is *Brevibacterium ammoniagenes*, whereas a suitable gram negtaive inoculum may comprise *Proteus mirabilis*.

If the treatment of the absorbent material 30 has been successful, that is, if the treatment has resulted in inhibition of growth of the bacteria, the test sample of FIG. 6 after incubation will appear yellow in color; however, if no inhibition of growth of the bacteria has occurred, the color of the sample 30 will be red. Odor will also indicate that growth of the bacteria has occurred.

II. Acidogenic Organisms

The teachings of the invention may be effectively utilized for testing the ability of absorbent test materials to inhibit the growth of test organisms used in standard test methods for the evaluation of germicides by the AOAC such as phenol coefficient test *Staphylococcus aureus*, use dilution test *Salmonella Choleraesuis*, Chambers or Black & Weber test *Staphylococcus aureus* and *Escherichia coli*; wherein the sterile culture media 12 may comprise, by weight:

|  | Percent |
|---|---|
| NaCl | 0.5 |
| Beef extract | 0.5 |
| Peptone (Thiotone or Bacto-Peptone) | 1.0 |
| $Na_2HPO_4$ | 1.74 |
| $KH_2PO_4$ | 0.76 |
| Glucose | 2.0 | pH adjusted to 6.8.
Distilled water, q.s. 100 milliliters.

The color indicator used was 0.002% Brom Thymol Blue.

The stable living inoculum may include any readily cultivated organism which will produce acid from a suitable substrate, such as, by way of example:

*Escherichia coli*—Gram negative
*Salmonella typhosa*—Gram negative
*Salmonella choleraesuis*—Gram negative
*Staphylococcus aureus*—Gram positive Inhibition of growth will be evidenced by the incubated test sample 30 of FIG. 6 being of a blue color; whereas a yellow color indicates no inhibition of growth.

III. With Fungi

Under this heading I am able to test the ability of absorbent materials to inhibit the growth of *Aspergillus niger*, a standard test organism.

The sterile culture media 12 comprises a mineral salts broth, such as

|  | Percent |
|---|---|
| $NH_4NO_3$ | 0.3 |
| $KH_2PO_4$ | 0.25 |
| $K_2HPO_4$ | 0.20 |
| $MgSO_4 7H_2O$ | 0.02 |
| $FeSO_4 7H_2O$ | 0.01 |
| Glucose | 0.75 |

Distilled water, q.s. 100 milliliters.

In this instance the stable living inoculum was *Aspergillus niger*.

Growth of this organism may be detected by gross visual examination of the surface of the test materials which should be suitably incubated for 14 days at 28° C. before examination. Samples showing areas of black growth indicates that the treatment to which the samples were subjected to inhibit the growth of *Aspergillus niger* were ineffective, since there will be no blackened areas visible on effectively fungistic materials.

In those instances where the materials being tested are not readily absorbent, such as, by way of example, nylon, duck, hair, etc., 0.5% "Polysorbate 80" (Atlas Powder Co., Wilmington, Delaware), may be added to the sterile culture media 12.

From the foregoing, it will be noted that I have provided a simple yet highly effective method of and means for determining the effectiveness of antibacterial treatment to which absorbent materials have been subjected.

It should be understood that various changes and modifications of the method and means may be made, within the scope of the appended claim, without departing from the spirit of the invention.

What is claimed is:

An apparatus for preparing a fresh culture of living microorganisms at the place of application thereof, comprising an elongate substantially tubular receptacle of a tough, pliable, fluid impervious material capable of being readily manually deformed, said receptacle having one end extended in the form of a nozzle having a dispensing passage leading from within the receptacle to the outer end of the nozzle, said passage being sealed by an integral removable closure at its outer end, said receptacle having its other end closed and permanently sealed, an elongate sealed frangible ampoule in and disposed longitudinally of the receptacle and having a body portion of a diameter slightly less than the major inside diameter of the receptacle and having an elongate frangible tip extending from one end toward said nozzle, said receptacle containing a quantity of culture medium in liquid form and said ampoule containing living microorganisms, and the said tough, pliable material of the receptacle being such as to facilitate the manual grasping and holding of the body of the ampoule and the deformation of the receptacle in the region of said frangible tip for the breaking of the latter.

References Cited in the file of this patent

UNITED STATES PATENTS

| 1,332,985 | Jarett | Mar. 9, 1920 |
| 2,619,448 | Larsen | Nov. 25, 1952 |
| 2,694,641 | Atwood et al. | Nov. 16, 1954 |
| 2,708,178 | Gyorgy | May 10, 1955 |
| 2,776,242 | Geks | Jan. 1, 1957 |
| 2,854,384 | Beakley et al. | Sept. 30, 1958 |
| 2,914,447 | Levin | Nov. 24, 1959 |